United States Patent [19]

Ringel

[11] Patent Number: 4,654,056

[45] Date of Patent: Mar. 31, 1987

[54] PROCESS FOR THE SEPARATION OF KRYPTON FROM A RADIOACTIVE WASTE GAS MIXTURE AND ARRANGEMENT FOR IMPLEMENTING THE PROCESS

[75] Inventor: Helmut Ringel, Niederzier Hambach, Fed. Rep. of Germany

[73] Assignee: Kernforschungsanlage Julich Gesellschaft mit beschrankter Haftung, Julich, Fed. Rep. of Germany

[21] Appl. No.: 649,803

[22] Filed: Nov. 29, 1984

Related U.S. Application Data

[62] Division of Ser. No. 484,245, Apr. 12, 1983, Pat. No. 4,562,000.

[30] Foreign Application Priority Data

Apr. 21, 1982 [DE] Fed. Rep. of Germany ....... 3214825

[51] Int. Cl.[4] ............................................ B01D 15/08

[52] U.S. Cl. ........................................ 55/197; 55/386

[58] Field of Search ................. 55/66, 67, 74, 75, 197, 55/386, 387, 389

[56] References Cited

U.S. PATENT DOCUMENTS

| | | | |
|---|---|---|---|
| 1,906,917 | 5/1933 | Peters et al. | 55/66 X |
| 4,012,490 | 3/1977 | Lofredo | 55/66 X |
| 4,369,048 | 1/1983 | Pence | 55/66 |
| 4,447,353 | 5/1984 | Pence et al. | 55/66 X |
| 4,469,496 | 9/1984 | Frischmuth et al. | 55/67 X |

FOREIGN PATENT DOCUMENTS

| | | | |
|---|---|---|---|
| 2118761 | 11/1983 | United Kingdom | 55/66 |

*Primary Examiner*—Robert Spitzer
*Attorney, Agent, or Firm*—Scully, Scott, Murphy & Presser

[57] ABSTRACT

A process for the separation of krypton from a radioactive waste gas mixture which is released during the chemical dissolution of burned-down nuclear fuel particles, and which in a carrier gas such as air, in addition to krypton, also contains xenon, argon, nitrous oxide and residual gas components. The waste gas mixture flowing out from a resolver has xenon removed therefrom after purifying the waste gas of nitrous oxides and radioactive residual gas components, such as aerosols, iodine, tritium and carbon(C-14) dioxide; and wherein krypton is finally withdrawn from the residual gas mixture and then stored. The invention also relates to an arrangement for the implementation of the inventive process. Subsequent to the purifying of the waste gas mixture from nitrous oxides and radioactive residual gas components, such as aerosols and iodine, a portion of the waste gas mixture is reconveyed into the resolver, and wherein the remaining portion of the waste gas mixture is purified of tritium and carbon(C-14) dioxide, and after an adsorptive removal of xenon discontinuously flows through a preparative gas chromatograph in which the krypton is separated from the residual gas. The remaining portion of the waste gas mixture is thereafter purified of tritium and carbon(C-14), which are removed in the form of HTO or, in essence, $^{14}CO_2$, and thereafter adsorptively freed from xenon. The remaining waste gas mixture containing krypton is discontinously conveyed to a preparative gas chromatograph in which the krypton is separated from the residual gas.

6 Claims, 2 Drawing Figures

PROCESS FOR THE SEPARATION OF KRYPTON FROM A RADIOACTIVE WASTE GAS MIXTURE AND ARRANGEMENT FOR IMPLEMENTING THE PROCESS

This is a divisional of copending application Ser. No. 484,245 filed in Apr. 12, 1983, now U.S. Pat. No. 4,562,000.

BACKGROUND OF THE INVENTION

1. Field of the Invention

The present invention relates to a process for the separation of krypton from a radioactive waste gas mixture which is released during the chemical dissolution of burned-down nuclear fuel particles, and which in a carrier gas such as air, in addition to krypton, also contains xenon, argon, nitrous oxide and residual gas components. The waste gas mixture flowing out from a resolver has xenon removed therefrom after purifying the waste gas of nitrous oxides and radioactive residual gas components, such as aerosols, iodine, tritium and carbon (C-14) dioxide; and wherein krypton is finally withdrawn from the residual gas mixture and then stored. The invention also relates to an arrangement for the implementation of the inventive process.

During the reconditioning of fuel elements, the nuclear fuel particles are chemically dissolved in order to separate out the fission products or their decomposition products which are produced during the reactor operation from the renewed fuel and/or breeder materials which are reusable for the production of fuel elements. The resolver has air conveyed thereto for the oxidation of the nuclear fuel materials. The air quantity which is introduced for the scavenging of the resolver is so adjusted that possibly all volatile radioactive harmful materials are picked up and conveyed away. For example, for a resolver having a 500 kg/h uranium throughput there must be calculated a scavenging air quantity requirement of 120 $Nm^3/h$.

2. Discussion of the Prior Art

Essentially three methods are currently known for the separation of krypton from the waste gas mixture: (a) low-temperature rectification after liquefying at least a portion of the waste gas mixture, (b) absorption of the krypton in suitable solvents, (c) adsorption on activated charcoal or molecular strainers.

Low-temperature rectification provides the advantage in that there can be achieved a high degree of enrichment, in effect, purity of the final products; in contrast therewith, a disadvantage resides in the high technological requirements, particularly with consideration given to the adequate operational safety of the installations as well as the considerable energy requirement; referring, for example, to German Pat. No. 24 26 764.

In order to avoid these risks and costs, the absorption or the adsorption of krypton is of significance. An absorption of krypton in solvents is described by Merriman et al., "Removal of noble gases by selective absorption", *International Symposium on Management of Gaseous Wastes from Nuclear Facilities*, Vienna, 1980. Freon is utilized as the solvent. For the adsorptive separation, from D. T. Pence et al. "Noble gas separation from nuclear effluents using selective adsorption with inorganic absorbents", 16th *DOE Nuclear Air Cleaning Conference*, San Diego, 1980, it is known to remove in sequential steps from the waste gas the components in the following sequence: $H_2O$, $CO_2$, Xe, $O_2$, Kr from an $N_2$ carrier gas stream in adsorption columns. The krypton separation is hereby effectuated in a quasi three-step mode, wherein the krypton is frozen out during one of the process steps. With regard to a further adsorptive noble gas separation, in particular the separation of xenon from the waste gas mixture, a discussion is set forth by H. Jungten et al., "Versuche zur adsorptiven Abtrennung von Edelgasen aus den Abgas einer Wiederaufarbeitungsanlage", 1978, pages 415 through 456, as well as in German Pat. No. 22 10 264. In accordance therewith, required for a waste gas throughput of 100 $m^3/h$ are approximately 8t of activated charcoal in order to remove the xenon and to enrich krypton in the remaining waste gas to a 25-fold concentration.

SUMMARY OF THE INVENTION

Accordingly, it is an object of the present invention to provide a process for the separation of krypton from a radioactive waste gas mixture, in which the flow of waste gas is reduced in order to facilitate an economic utilization of adsorption processes in which there is concurrently achieved a high extent of enrichment of the krypton in the waste gas flow with an extensive separation of nitrous oxide and xenon, and wherein krypton is completely separable from the remaining waste gas.

The foregoing object is attained in accordance with the present invention in that, subsequent to the purifying of the waste gas mixture from nitrous oxides and radioactive residual gas components, such as aerosols and iodine, a portion of the waste gas mixture is reconveyed into the resolver, and wherein the remaining portion of the waste gas mixture is purified of tritium and carbon (C14) dioxide, and after an adsorptive removal of xenon discontinously flows through a preparative gas chromatograph in which the krypton is separated from the residual gas. The remaining portion of the waste gas mixture is thereafter purified of tritium and carbon (C-14), which are removed in the form of HTO or, in essence, $14CO_2$, and thereafter adsorptively freed from xenon. As mentioned above, the remaining waste gas mixture containing krypton is discontinuously conveyed to a preparative gas chromatograph in which the krypton is separated from the residual gas. These measures pursuant to the invention result in the following advantages:

Through the recycling of a partial gas flow subsequent to the separation of nitrous oxides, aerosols ahd iodine, the fresh air supply to the resolver can be lowered at an unreduced purifying gas flow, and the krypton component rise within the waste gas mixture. Reduced thereby is also the waste gas quantity which is introduced into the regions of the gas separating installation provided for the further purification of the waste gas mixture. This favors the utilization of adsorptive separating processes. A recycling of the portion of the waste mixtures produced in the resolver entirely without the supply of air as described, for example, in German Pat. No. 26 02 897, is of small practical significance because of the then significantly reduced ability to oxidize of the nuclear fuel. It is suitable that at least one-half of the waste gas mixture discharged from the resolver be recycled. The highest proportion of the part gas flow which is to be reconveyed is limited by the required oxygen supply necessary for the dissolution and purification process.

Prior to the adsorptive separation of the xenon from the discharged partial gas flow of the waste gas mixture, there are also separated out tritium in the form of HTO and carbon(C-14) dioxide. This improves the separation of the noble gases xenon and krypton through adsorption and leads to higher degrees of enrichment of krypton in the remaining waste gas mixture. The quantity of the flow of waste gas containing krypton is significantly reduced in comparison with the entire waste gas quantity discharged from the resolver and consists of less then 1/10 of the total waste gas quantity. This remaining waste gas mixture is now discontinuously separated out in a preparative gas chromatograph. Preparative gas chromatographs provide a gas throughput which is approximately $10^3$ times as large as the gas throughput of analytical gas chromatographs, since the extensive reduction of the total resolver waste gas which is achieved in combination with the previously mentioned measures is decisive with regard to the utilization of preparative gas chromatographs for the purification of the waste gases which are formed during the chemical dissolution of the nuclear fuels. Within gas chromatographs there is achieved the complete separation of krypton.

In a further embodiment of the invention, prior to the adsorptive separation of xenon, held back at a molecular strainer are nitrous oxide components which have still remained in the waste gas mixture after flowing through a nitrous oxide washer, as well as tritium. This facilitates the adsorptive separation of the noble gas components from the waste gas by means of activated charcoal, which evidences a high adsorption capacity. The molecular strainer, in an advantageous manner, is regenerable by the recycled waste gas mixture, so that the tritium which is carried along by the recycled waste gas mixture remains within the recycling loop of the gas separating installation, and will thereafter enrich itself in the fuel solution within the resolver. The carbon (C-14) dioxide is selectively removed from the waste gas.

The preparative gas chromatograph is operated with helium, from which the krypton allows itself to be easily separated. The krypton is suitably separated by activated charcoal contained in storage flasks from the work medium of the gas chromatograph.

BRIEF DESCRIPTION OF THE DRAWINGS

Reference may now be had to the following detailed description of the inventive process and of an inventive arrangement for the implementation of the process on the basis of the schematically illustrated embodiments, as shown in the accompanying drawings; in which.

DETAILED DESCRIPTION

Figure 1:
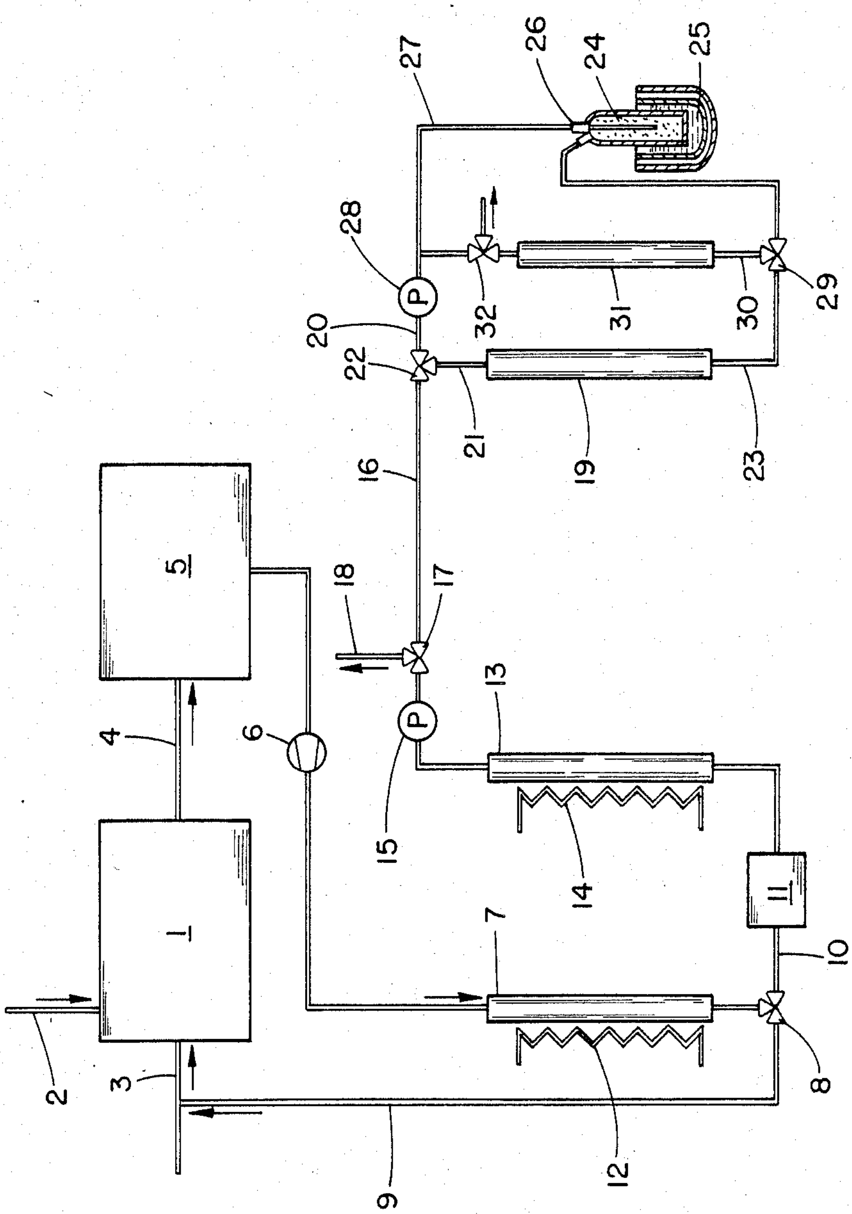
FIG. 1 illustrates a generally schematic representation of an inventive gas separating installation.

The gas separating installation illustrated in FIG. 1 includes a resolver 1, an inlet 2 for nuclear fuel particles and an inlet 3 for air. The air rinses through the resolver 1 and exits therefrom together with volatile materials formed in the resolver, in particular with krypton and xenon, through a waste gas conduit 4. From the waste gas conduit 4, the waste gas mixture then flows into a purification zone 5 which contains a nitrous oxide washer ($NO_x$) for the waste gas, as well as an aerosol filter and an iodine filter. The remaining residual gas mixture is conveyed by a means of a pumping apparatus 6 into an adsorber 7 for tritium. Tritium is contained in the waste gas in the form of HTO. In the exemplary embodiment, a molecular strainer is utilized in the adsorber 7 which, in addition to tritium, also holds back residual nitrous oxide components $NO_x$, to the extent that these could not be completely separated out of the waste gas in the nitrous oxide washer of the purification zone 5. For example, adapted as the molecular strainer is an acid-resistant molecular strainer having an 8–9 Å pore size and a high $SiO_2$ component. Adsorbed on such a molecular strainer would be 20 ml $NO_2$ per ml molecular strainer.

A three-way valve 8 is located at the outlet of the adsorber 7, by means of which the waste gas mixture leaving the adsorber is conveyable either into a recycling conduit 9 which connects into the inlet 3 for air, or into a connecting conduit 10 leading to a carbon (C-14) filter 11. For purposes of clarity there is illustrated in the drawings only one adsorber 7. For a quasi-continual operation of the gas separating installation, at least two adsorbers are connected in parallel, wherein during each operating phase one of the adsorbers adsorbs the harmful materials, while the other adsorber is desorbed while being heated by means of a heating arrangement 12. Within the desorption phase of one adsorber 7, that portion of the waste gas mixture which has charged itself during through-flow with tritium and nitrous oxides, is conveyed through the recycling conduit 9 back to the resolver 1. Thus, tritium will enrich in the fuel solution within the resolver 1.

The portion of the waste gas mixture which is purified of tritium and residual nitrous oxide during the adsorption phase of the adsorber 7, streams through the carbon (C-14) filter, 11 to the adsorber 13 for xenon and krypton. Within the carbon (C-14) filter, adapted for the fixing of the carbon (C-14) dioxide is, for example, $Ba(OH)_2$ in a vortex bed.

Effected thereafter in the adsorber 13 a common adsorption of xenon and krypton; in the exemplary embodiment, an adsorption on activated charcoal under cooling of the adsorber and at an increased pressure. At a temperature of $-10°$ C. which is adjusted through a temperature controlling installation 14 with a cooling and heating component, not shown in detail in the drawing, and with an inlet pressure at the adsorber 13 of about 3 bar, there can be doubled increase in the charging of the activated charcoal with the noble gases, in contrast with a charging at room temperature and at an inlet pressure of 1.75 bar. For desorption, the adsorber 13 is heated to a temperature exceeding 100° C. A suitable desorption temperature was obtained at 125° C. Herewith, when purifying with nitrogen or air, there initially separated out krypton, thereafter xenon.

Although the heating arrangement 12 for the adsorber 7 and the temperature controlling installation 14 for the adsorber 13 are schematically or symbolically shown as external heating coils, they can each be readily constructed as a heating element located within the adsorber chamber. Alternatively, they can be constructed as external heaters, for instance, as an element encompassing the shell of the adsorber.

From the adsorber 13 the waste gas is aspirated by means of a circulating pump 15. Located in a gas conduit 16 which is connected to the pressure-side of the circulating pump 15 is a three-way valve 17 which communicates with a discharge 18 through which the purified waste gas can flow off into atmosphere during the adsorption phase of the adsorber 13, as well as xenon during desorption together with the purifying gas of the adsorber 13; for example, nitrogen or air. When krypton is desorbed in the adsorber 13, then the three-way valve 17 is switched over, and the gas mixture which is constituted of the purifying gas and krypton, streams into a preparative gas chromatograph 19. For the quasi-continual operation of the gas separating installation, at least one further adsorber is connected in parallel with the adsorber 13, which adsorbs while the other adsorber desorbs. The parallel connected adsorber is not illustrated in the drawings for purposes of clarity.

The preparative gas chromatograph 19 is operated with helium. For this purpose, a helium conduit 20 connects into an inlet conduit 21 leading to the gas chromatograph 19. Into the inlet conduit 21, by means of a valve 22 there can also be introduced the gas mixture from the gas conduit 16. This gas mixture essentially consists of air or nitrogen, and contains the entire krypton quantity produced in the resolver 1. Carried out in the gas chromatograph 19 is the separation of this residual gas flow in accordance with the principle of the elutriation chromatography: A limited gas quantity is rinsed through the gas chromatograph by means of helium used as carrier gas, so that there is achieved a multiple-step separating effect. Thereafter, air and helium stream out of the gas chromatograph, subsequently krypton with helium. The operating temperature of the gas chromatograph, in the exemplary embodiment, consisted of 95° C., the throughput of helium relative to the introduced waste gas quantity maintained itself at a ratio of 4:1.

The krypton/helium gas mixture is conveyed from the preparative gas chromatograph 19 through a supply conduit 23 into a storage flask 24 which is filled with activated charcoal and which, in the exemplary embodiment, is constituted of alloy steel, in which the krypton is adsorbed under cooling with liquid nitrogen in a cooler 25, and separated from the more readily volatile helium. The helium is reconveyed at the purified gas outlet 26 of the storage flask through a suction conduit 27 of a gas pump 28 in a closed circuit to the helium conduit 20 and returned to the gas chromatograph 19. Also, the air-conductive helium flow which is cleansed of krypton air can be reused for the rinsing of the gas chromatograph 19. For this purpose, through adjustment of the three-way valve 29, the gas mixture is introduced through a gas discharge 30 into an adsorber 31 which is also filled with activated charcoal, from which there can be withdrawn either purified helium or purified air through a three-way valve 32. The helium is introduced into the suction conduit 27, the air is vented to atmosphere.

Illustrated schematically in the drawing schematically for the gas chromatograph 19 and as well for the adsorber is, presently, only one separating column. However, for the quasi-continual operation of the gas separating installation, also for these two apparatuses at least two separating columns are connected in parallel, which are operated concurrently. For the adsorber 31 one of the separating columns operates desorptively, while the other one is operated adsorptively.

In the gas separating installation, the recycled waste gas pursuant to the exemplary embodiment evidences the following composition: 80% by vol. of $N_2$, 18% by vol. of $O_2$, 0.9% by vol. of Ar, 0.5% by vol. of $NO_x$, 1.0% by vol. of Xe, 0.1% by vol. of Kr, as well as traces of $H_2O$, $CO_2$ and other residual gas components. At the inlet into the preparative gas chromatograph 19, the waste gas consisted of: 2% by vol. of Kr, 0.1% by vol. of Xe, 8% by vol. of $O_2$, 90% by vol. of $N_2$. The entire resolver waste gas flow can thus be reduced to about the 1/40th past, for example, from 100 $Nm^3/h$ to 2.5 $Nm^3/h$.

Figure 2:
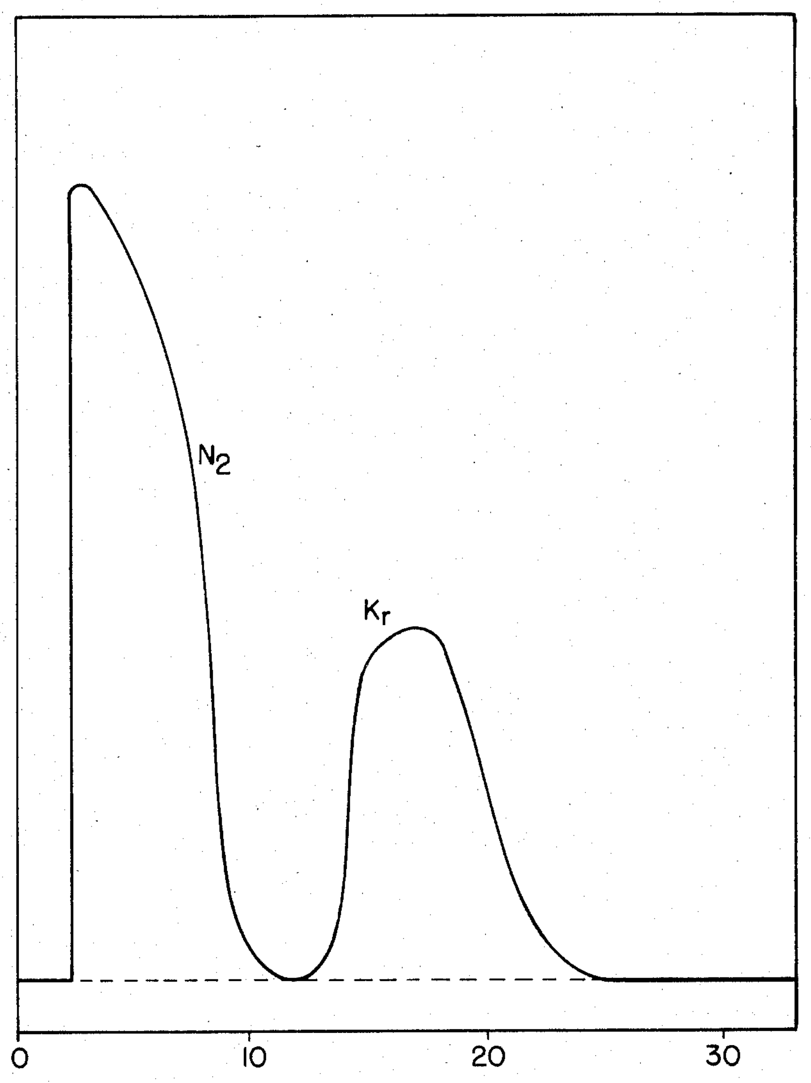
FIG. 2 illustrates the chromatographic graph of a preparative gas chromatograph utilized in the gas separating installation of FIG. 1.

A chromatographic plot of the separation of a gas quantity of 100 Nml containing essentially nitrogen and krypton with a helium carrier gas flow of 20 Nml/min in a gas chromatograph having an activated charcoal filling is illustrated in FIG. 2 of the drawings. In the storage flask 24, the krypton discharged together with the helium from the gas chromatograph can be fully separated. The thus recovered helium is reconveyed in a closed circuit as cleansing gas to the gas chromatograph.

What is claimed is:

1. Means for the separation of Krypton from a radioactive waste gas mixture containing Krypton, Xenon, nitrous oxides and residual gas components, said components selected from members of the group consisting of aerosols, iodine, and tritium, said means comprising;

(a) a resolver means for receiving radioactive waste gas, nuclear fuel particles and a carrier gas;

(b) a first purifying means including means communicating with said resolver means for receiving a waste gas flow from said resolver means, said first purifying means selectively retaining nitrous oxides and radioactive residual gas components, said components selected from members of the group consisting of aerosols, iodine, and tritium;

(c) first means for recirculating the waste gas mixture to said resolver means after removal of said nitrous oxides and residual gas components to thereby enrich the Krypton in the waste gas mixture;

(d) an adsorber means including means communicating with said first purifying means for receiving said Krypton enriched waste gas mixture from said first purifying means, said adsorber means having at least one adsorber for selectively retaining Krypton and Xenon;

(e) second means for periodically and selectively desorbing the Krypton and Xenon from said adsorber means, said second means communicating with said adsorber means and having a conduit for conveying Krypton and a carrier gas to a preparative gas chromatograph for separation of Krypton;

(f) means for accumulating Krypton from an output of said preparative gas chromatograph.

2. Gas separating installation as claimed in claim 1, wherein an adsorber for retaining nitrous oxide and tritium is connected within a recirculating loop of the first purifying means.

3. Gas separating installation as claimed in claim 2, wherein a carbon (C-14) filter is connected between an outlet of the first purifying means and the adsorber means.

4. Gas separating installation as claimed in claim 1 or claim 2 or claim 3, including a conduit for helium connected to an inlet of the gas chromatograph.

5. Gas separating installation as claimed in claim 4, wherein said means for accumulating krypton includes a conduit for krypton-containing waste gas connected to a storage flask filled with activated charcoal and a purified gas outlet for the helium.

6. Gas separating installation as claimed in claim 5, wherein the helium is reconveyed in a closed circuit from the purified gas outlet to the inlet of the gas chromatograph.

* * * * *